United States Patent [19]
Hanif et al.

[11] Patent Number: 5,796,954
[45] Date of Patent: Aug. 18, 1998

[54] METHOD AND SYSTEM FOR MAXIMIZING THE USE OF THREADS IN A FILE SERVER FOR PROCESSING NETWORK REQUESTS

[75] Inventors: Mohammad Hanif, Fremont; Kazuhisa Yanagihara, Santa Cruz, both of Calif.

[73] Assignee: Apple Computer, Inc., Cupertino, Calif.

[21] Appl. No.: 542,836

[22] Filed: Oct. 13, 1995

[51] Int. Cl.$^6$ ............................................. G06F 9/00
[52] U.S. Cl. ........................ 395/200.61; 395/200.6; 395/674
[58] Field of Search ........................ 395/200.01, 650, 395/700, 872, 670, 840, 874, 876, 200.6, 200.61, 674

[56] References Cited

U.S. PATENT DOCUMENTS

| 5,150,464 | 9/1992 | Sidhu et al. | 395/200 |
|---|---|---|---|
| 5,282,270 | 1/1994 | Oppenheimer et al. | 395/200 |
| 5,319,782 | 6/1994 | Goldberg et al. | 395/650 |
| 5,388,213 | 2/1995 | Oppenheimer et al. | 395/200 |
| 5,430,850 | 7/1995 | Papadopoulos et al. | 395/375 |
| 5,485,626 | 1/1996 | Lawlor et al. | 395/650 |
| 5,504,898 | 4/1996 | Klein | 395/650 |
| 5,517,656 | 5/1996 | Shi | 395/800 |
| 5,524,247 | 6/1996 | Mizuno | 395/726 |
| 5,553,305 | 9/1996 | Gregor et al. | 395/826 |
| 5,600,596 | 2/1997 | Shirakihara | 365/189.01 |
| 5,613,071 | 3/1997 | Rankin et al. | 395/200.16 |
| 5,613,155 | 3/1997 | Baldiga et al. | 395/825 |
| 5,623,688 | 4/1997 | Ikeda et al. | 395/800 |
| 5,627,829 | 5/1997 | Gleeson et al. | 370/230 |

OTHER PUBLICATIONS

Modern Operating Systems, A. Tanenbaum; Prentice Hall Pub. Co., 1992 Chapter 12, Processes and Processors in Distributed Systems; pp. 507–511

*Primary Examiner*—Mehmet B Geckil
*Attorney, Agent, or Firm*—Sawyer & Associates

[57] ABSTRACT

A system and method for maximizing the use of threads in a file server process for processing requests received from entities on a network. The file server process includes a first socket and a plurality of second sockets for receiving requests from entities on a network. The file server process comprises a first queue for storing requests received from the first socket, and a second queue for storing requests received from the plurality of second sockets. The file server processes the requests in the first queue with a first set of threads, and processes the requests in the second queue with a second set of threads.

12 Claims, 6 Drawing Sheets

METHOD AND SYSTEM FOR MAXIMIZING THE USE OF THREADS IN A FILE SERVER FOR PROCESSING NETWORK REQUESTS

CROSS-REFERENCE TO RELATED APPLICATIONS

The present application is related to applications Ser. No. 08/542,944, entitled "A METHOD AND SYSTEM FOR INCREASING THE NUMBER OF ENTITIES THAT CAN BE SERVICED BY A FILE SERVER" and Ser. No. 08/542,834, entitled "A METHOD AND SYSTEM FOR ASSIGNING THREADS TO ACTIVE SESSIONS," filed on the same date as the present application and assigned to the assignee of the present application.

FIELD OF THE INVENTION

The present invention relates to a method and system for transferring data between a source and a plurality of network entities, and more particularly to a method and system for maximizing the use of threads in a multithreaded file server for processing network requests.

BACKGROUND OF THE INVENTION

In the computing industry, it is quite common to transfer data and commands between a plurality of data processing devices, such as computers, printers, displays, terminals, and other network resources. Local Area Networks (LANs) allow the transfer of data between a localized set of computing and peripheral devices, typically in the same geographical area such as one building or a plurality of buildings closely situated together. Examples of such LANs may be found in U.S. Pat. Nos. 4,063,220, 4,661,902, and 4,689,786.

In the AppleTalk (R) (a trademark of Apple Computer, Inc.) network system, each "node" or computer, printer, peripheral, and other network resources share resources with a file server. The file server includes two main AppleTalk protocols called the AppleTalk Filing Protocol (AFP), AppleTalk Session Protocol (ASP), and the operating system of the file server includes the AppleTalk Transaction Protocol (ATP). The AFP is a protocol dealing with issues that are file system related. The AFP uses ASP to receive file system requests from a client and to send responses back to the network entities. The request and responses may be partitioned into smaller data packets and ASP uses ATP to send and receive these data packets on the network.

The ASP is a protocol for maintaining network sessions between the file server and the network entities. The ASP opens multiple ATP sockets that are network visible entities and are associated with processes within a network entity. The ASP classifies the ATP sockets into two different categories. One is a Server Listening Socket (SLS) and another is a Server Session Socket (SSS). Incoming network requests are received at these two types of sockets.

The incoming network requests are traditionally handled by using I/O completion routine chaining. In this approach, when an incoming request is received at a socket, the ATP places the requests into memory for processing by the file server. While the request is being processed, this memory is unavailable for further listening of incoming requests and any subsequent requests are lost, resulting in a poor network performance.

The file server includes file server software that is implemented as a multithreaded process. Network tasks are broken into sub-tasks and assigned to individual threads for further processing. Although conventional file server software include multiple threads of execution, the use of the threads is inefficient, requires too many threads which waste system resources, and does not guarantee that all incoming requests will be received by the file server.

What is needed therefore is a method for increasing the use of the threads so that loss of network requests is minimized. The present invention addresses such a need.

SUMMARY OF THE INVENTION

The present invention provides a method and system for maximizing the use of threads in a file server process for processing requests received from entities on a network. The file server process includes a first socket and a plurality of second sockets for receiving requests from entities on a network. The file server process comprises a first queue for storing requests received from the first socket, and a second queue for storing requests received from the plurality of second sockets. The file server processes the requests in the first queue with a first set of threads, and processes the requests in the second queue with a second set of threads.

According to the system and method disclosed herein, the present invention enables the file server to receive a greater number of network requests with minimal loss even though there is a lesser number of threads available for processing, thereby increasing overall system performance.

DESCRIPTION OF THE INVENTION

The present invention relates to an improvement in a server utilized in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
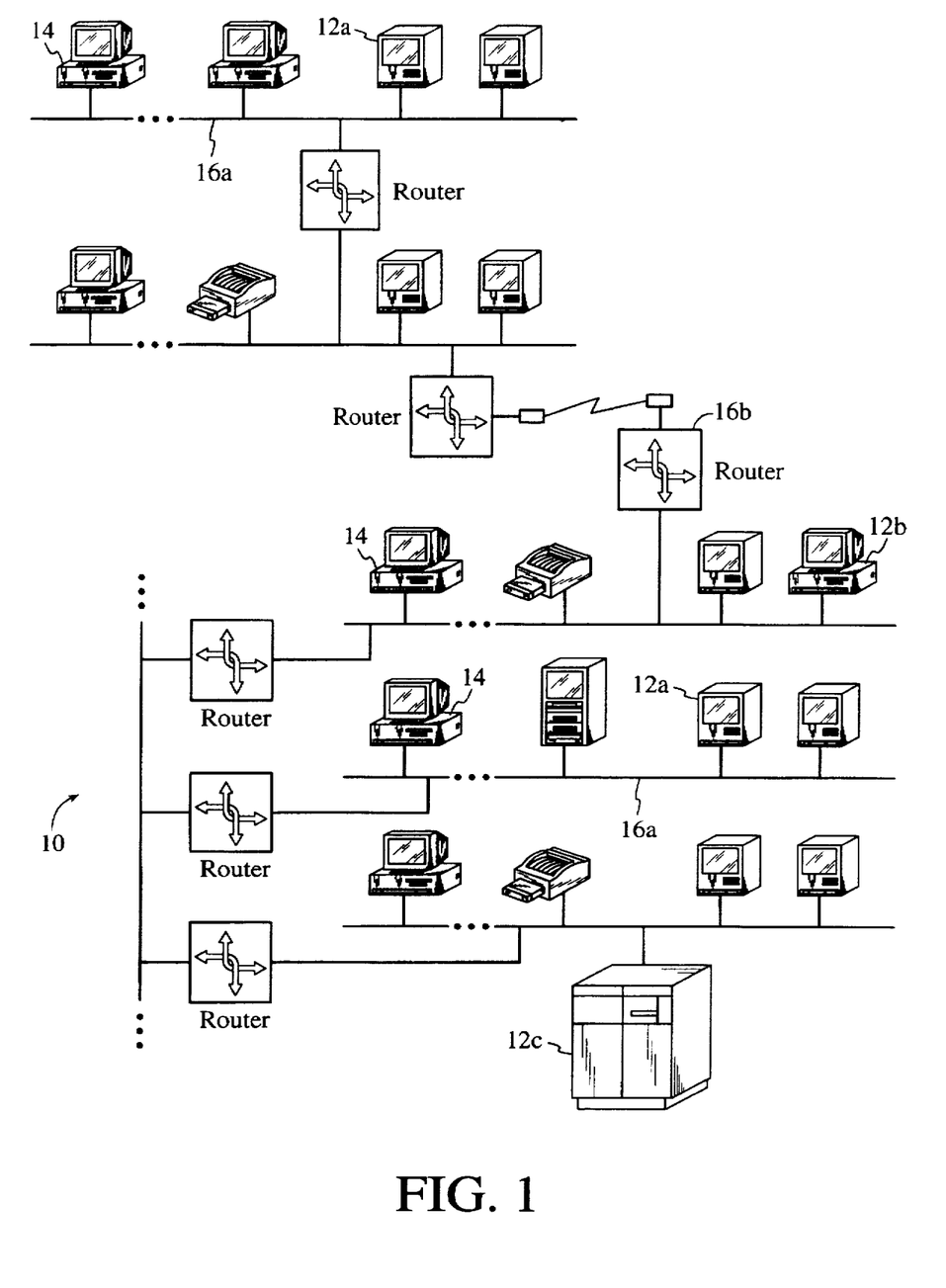
FIG. 1 is a block diagram illustrating a computer network system.

FIG. 1 is a block diagram illustrating a computer network environment in which the present invention resides. The network 10 may include a plurality of computers, such as personal computers 12a, minicomputers 12b, and mainframes 12c, and server devices 14, such as a file and printer servers. For the purposes of this specification, all data processing and peripheral devices which are coupled to the network are collectively referred to as entities 12. The entities 12 may be connected through a variety of network connection devices 16 such as cables 16a and routers 16b, for example. The purpose of the network 10 is to eliminate access barriers resulting from physical separation between the various entities 12 and to share the resources the entities 12 contain.

Figure 2:
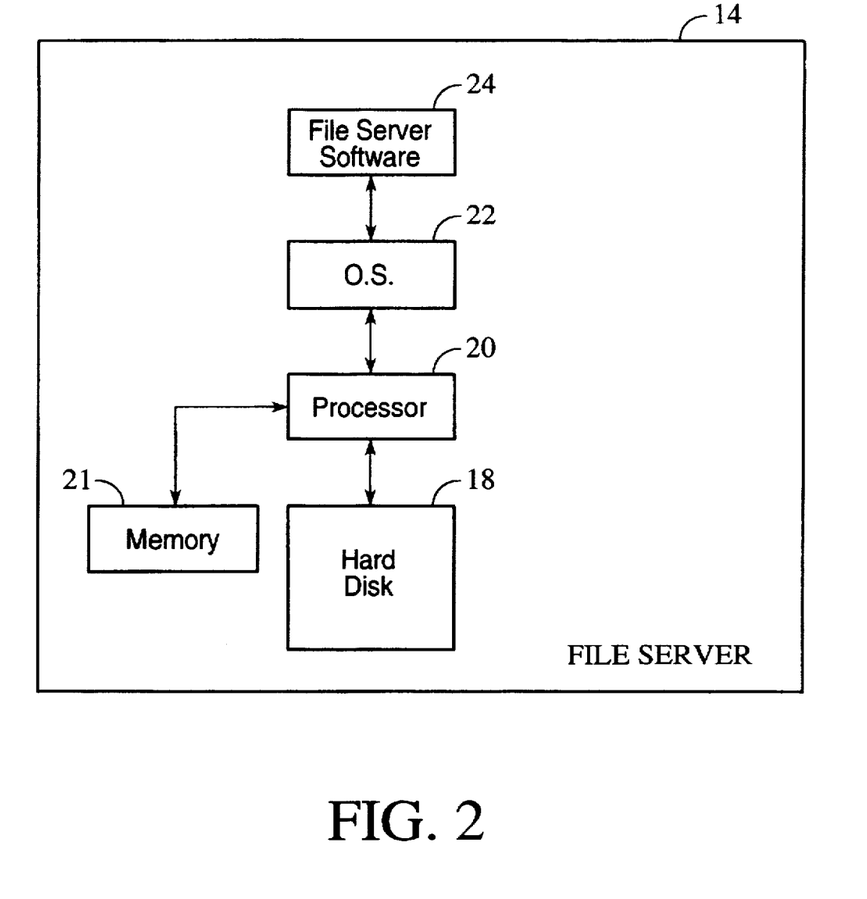
FIG. 2 is a block diagram of a server 14 in which the present invention is implemented.

FIG. 2 is a block diagram of a server 14 in which the present invention is implemented. The server includes one or more hard disk drives 18, a processor 20, memory 21, an operating system 22, and file server software 24. The file server software 24 enables a computer to become a file server 14 for one or more entities 12, on the network.

In a preferred embodiment, the file server software 24 is Appleshare File Server software, which utilizes a protocol architecture called AppleTalk. Both Appleshare and AppleTalk were designed and developed by Apple Computer, Cupertino, Calif. Also in a preferred embodiment, the processor 20 is a PowerPC manufactured by Motorola and, the operating system 22 is a Macintosh Operating System, such as System 7.5, for example.

Figure 3:
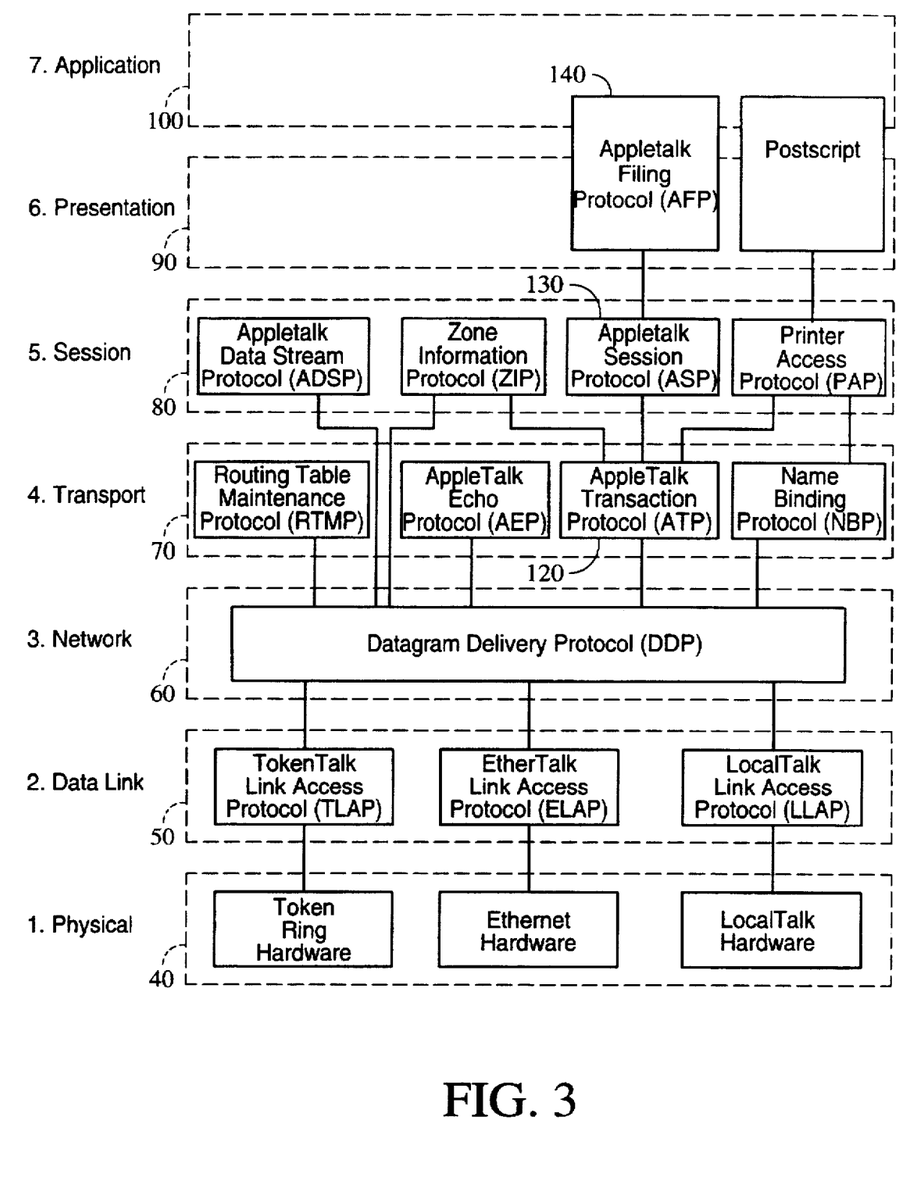
FIG. 3 is a diagram illustrating the AppleTalk protocol architecture within the framework of the Open Systems Interconnection (OSI) reference model.

Referring to FIG. 3, the AppleTalk protocol architecture is shown within the framework of the Open Systems Interconnection (OSI) reference model developed by the International Standards Organization (ISO). The OSI model defines the concepts of a protocol and a service interface that includes seven layers: Physical 40, Data Link 50, Network 60, Transport 70, Session 80, Presentation 90, and Application 100. The layers allow data packets to be transmitted from a variety of hardware to another, and from one process (socket) to another. Each layer functions as a separate process or filter that either appends protocol information onto existing data packets transmitted in the network 10, or routes appropriate data packets through the network 10 depending on the type of packet and the particular layer in which the packet resides.

Referring to both FIGS. 1 and 3, the higher-level network services in both OSI and AppleTalk are built using the model of a entity 12 issuing a sequence of commands to a server 14. The server 14 carries out the commands and then reports the results to the entity 12. The present invention relates to the interaction between the following higher-level AppleTalk protocols: the AppleTalk Transaction Protocol (ATP) 120, the AppleTalk Session Protocol (ASP) 130, and the AppleTalk Filing Protocol (AFP) 140. The AppleTalk protocol is described in further detail in *Inside AppleTalk* (R), by Gursharan Sidhu, Richard F. Andrews, and Alan B. Oppenheimer (2d Ed. 1990), published by Addision-Wesley, which is herein incorporated by reference.

The purpose of the AFP 140 is to allow the server to share files with the entities 12 on the network 10 through network commands. The ASP 130 serves the AFP 140 and is used to establish a connection, called a session, between an entity 12 and the server 14. A command from an entity 12 to a server 14 may require several data packets to be sent across the network 10. The ATP 120 provides the ASP 130 with a transaction service for sending and receiving packets across the network 10.

Typically, packets are sent and received between an entity 12 and the server 14, but packets may also be sent and received between software processes. Each entity 12 in the network 10 may include one or more software processes. One software process can request that another software process perform a higher-level function and then report the outcome. A software process that makes use of the services of another software process is called a client. This interaction between a requesting client and a responding client is called a transaction, and is handled by the ATP 120. For purposes of this discussion, when an entity 12 on the network initiates a transaction with the file server 14, the entity 12 is the requesting client and the file server 14 the responding client.

Figure 4:
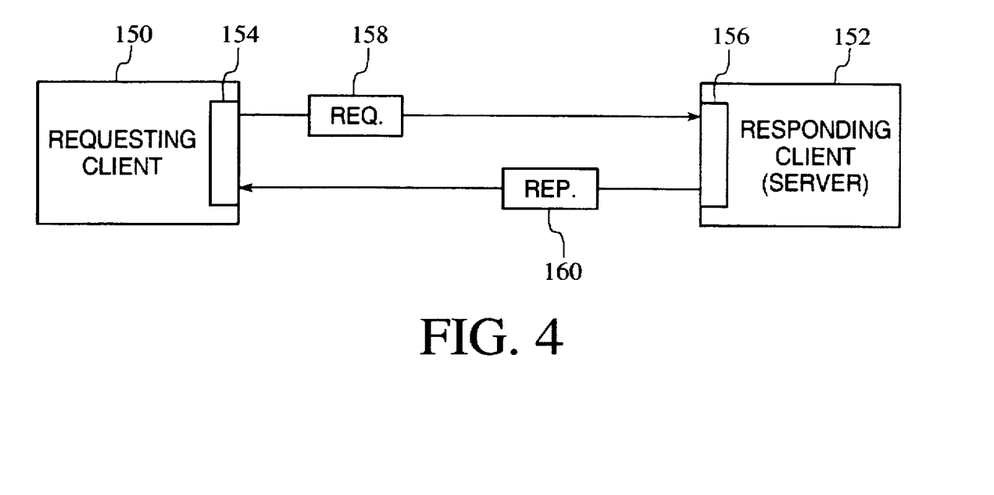
FIG. 4 is a block diagram illustrating the basic structure of a transaction between a requesting client and a responding server.

FIG. 4 is a block diagram illustrating the basic structure of a transaction between a requesting client 150 and a responding server 152. In order to send and receive transactions, a client must first create an addressable entity on the network called a socket. This is accomplished by both the requesting client 150 and the responding server 152 making a call to the ATP 120 to open a respective socket 154 and 156. The socket opened at the responding entity is called a transaction listening socket. Both the requesting client 150 and the responding server 152 can have multiple sockets for receiving/transmitting transactions, where each socket is identified by a unique 8-bit socket number.

The requesting client 150 initiates a transaction by issuing a call to the ATP 120 and supplying the parameters of the request. Once the transaction request packet 158 is received by the socket 156 of the responding server 152, the transaction request is serviced and the responding server 152 returns a transaction response packet 160 reporting the transaction outcome.

Before an entity 12 can send transaction requests to a server 14, a session must be established between them. Whereas the ATP 120 handles individual transactions, the ASP 130 establishes and maintains sessions between each entity 12 and the server 14. For the duration of the session, the entity 12 can send a sequence of commands to the server 14. The ASP 130 ensures that the commands are delivered without duplication in the same order as they were sent, and sends the results of the commands back to the entity 12. In order to open and then maintain sessions, the ASP 130 utilizes two different types of sockets for receiving two different types of requests.

Figure 5:
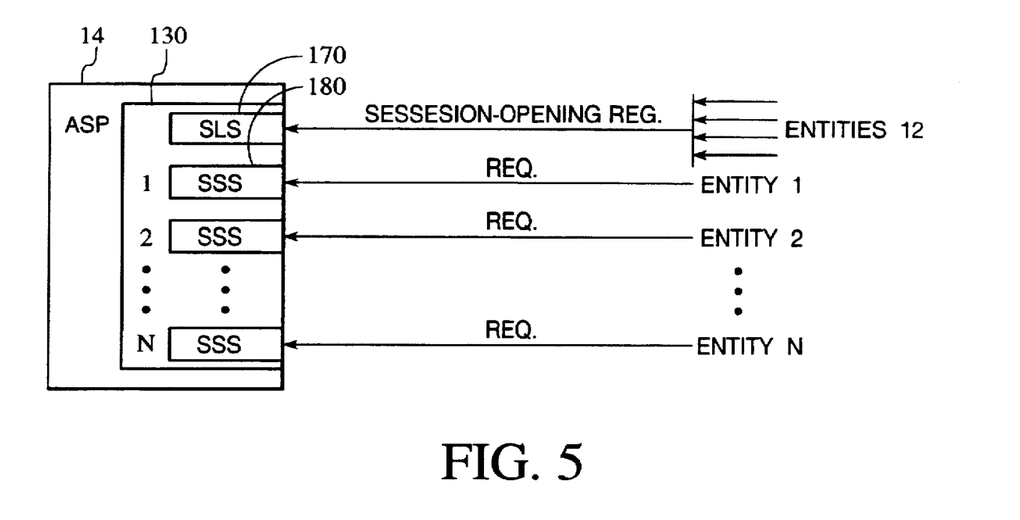
FIG. 5 is a block diagram illustrating the two different types of sockets utilized by the ASP.

FIG. 5 is a block diagram illustrating the two different types of sockets utilized by the ASP 130. In order to make itself known on the network 10 to other entities, the ASP 130 calls the ATP 120 (FIG. 3) to open an ATP responding socket, known as the session listening socket (SLS) 170. The SLS is used to listen for session-opening requests from the entities 12 on the network 10.

Once a session is established between an entity 12 and the server 14, a server session socket (SSS) 180 is used to listen for network requests from a particular entity 12 in all further communication during that session. Thus, for every open session between an entity 12 and the server 14, there is a corresponding network addressable SSS in which the entity 12 sends all future requests.

Once an entity 12 sends a session-opening request to the server 14 and a session is established, a session object is created in the server 14 in which all information about the entity 12 is kept. In addition, a corresponding session is opened in the AFP 140 for that entity 12 with different information. Therefore, if there are N ASP sessions there are N AFP sessions. When the ASP 130 receives an ASP request from an SSS 180, the ASP 130 passes the request to the AFP 140.

When either a session-type request is received at the SLS 170 or a command-type request is received at each SSS 180, the requests must be processed by the ASP 130. Referring again to FIG. 2. ASP requests are traditionally handled by using I/O completion routine chaining. In this approach, the ASP 130 allocates an amount of memory 21 to make N number of ATP calls to listen to N number of requests. This means that when a request from the network arrives at the server 14, the ATP 120 places the incoming request into memory 21, and this memory 21 is unavailable for further listening of incoming requests until the file server software 14 processes and sends a response to the request. Furthermore, not having a call pending to listen for incoming requests means that any subsequent requests are lost, resulting in a poor network performance.

According to the present invention, the task of processing network requests is partitioned into two levels wherein the requests are first queued and then processed through multiple threads of execution such that subsequent requests are not lost and the use of all the threads is maximized.

Figure 6:
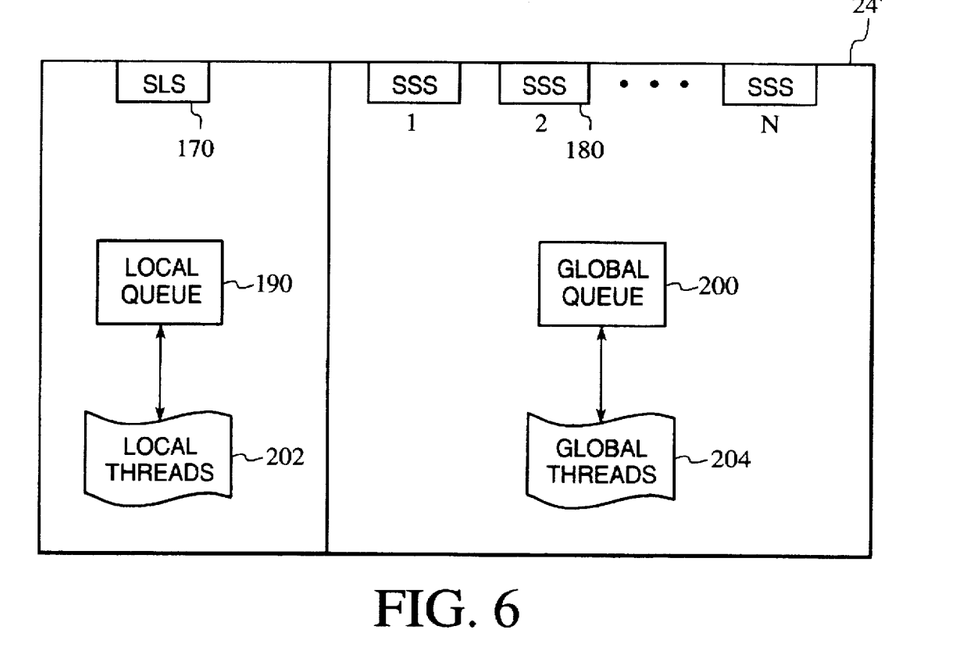
FIG. 6 is a block diagram on a preferred implementation of the requests processing method and system of the present invention.

To more particularly illustrate the request processing method and system of the present invention, refer now to FIG. 6 depicting a block diagram of one implementation of such a system. The file server software 24' of the present invention includes a local queue 190 for storing requests received at the SLS 170, and a global queue 200 for storing requests received at the SSS's 180. As stated above, the file server software 24' opens only one SLS 170 and N SSS's 180.

One aspect of the present invention is to increase the throughput of the file server software 24' using multiple threads of execution. According to the present invention, a plurality of local threads 202 is assigned to the local queue 190 for processing session-type requests, and a second plurality of global threads 204 is assigned to the global queue 200 for processing command-type requests. Threads in general are sometimes referred to as mini-processes. Referring to both FIGS. 2 and 6, the threads 202 and 204 share both address space and resources, and since typical file servers 14, only have one processor 20, the threads 202 and 204 are time-sliced on the processor 20.

Since each of one of the threads in threads 202 and 204 require a significant amount of memory 21, the number of threads utilized is minimized such that the total number of threads 202 and 204 is significantly less than the total number of sessions supported by the server 14. Similar to traditional processes (i.e., processes with only one thread of execution), each of the threads 202 and 204 can be in any one of several states: running, blocked, and ready. A running thread is currently being executed by the processor 20 and processing a request. A blocked thread is blocked on a queue waiting for a request to process, and while blocked, another thread in the same process can run. And a ready thread is scheduled to be executed by the processor 20.

According to the present invention, the local threads 202 are blocked on the local queue 190, while the global threads 202 are blocked on the global queue 200. With the local queue 190, the local threads 202 are associated with one SLS 170. Request packets are read into the local queue 190 only from the SLS 170. Since the file server software 24' can only have a limited number of threads as threads require more memory, this method proves to be very efficient. Using this method, less number of threads achieves higher performance.

With the global queue 200, the global threads 204 are not associated with a specific SSS 180. Since the global threads 204 block only on the global queue 200, each one of the global threads 204 is available to process requests regardless of on which socket a request is received. According to the present invention, maximum utilization of the all the global threads 204 is achieved even when only one entity 12 is logged on to the file server 14, i.e., low load cases.

After the sockets 170 and 180 have been opened by the ASP 130, the ATP 120 notifies the ASP 130 when a request arrives. In order to receive the request from the ATP 120, the ASP 130 must issue what is called SPGetRequest calls to provide buffer space (memory) for the receipt of the requests. When a request has been received, the SPGetRequest call completes and identifies the type of ASP request.

According to the present invention, the work of processing requests is divided into two phases, initialization and queuing, to further improve performance. The initialization phase takes place when the server 14 is initialized and the queuing phase occurs when request are received.

Figure 7:
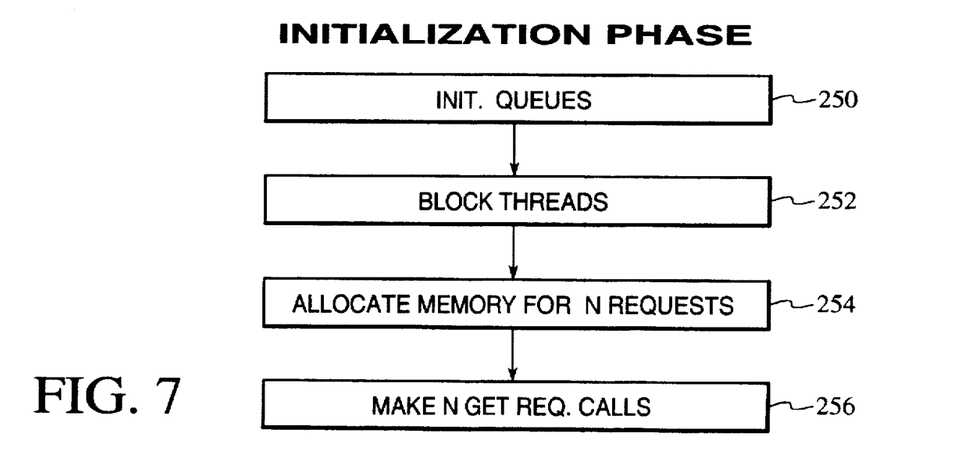
FIG. 7 is a flow chart depicting the steps taken during the initialization phase of the present invention.

FIG. 7 is a flow chart depicting the steps taken during the initialization phase after the sockets 170 and 180 have been opened. Referring to FIGS. 6 and 7, the file server software 24' initializes the local queue 190 and the global queue 200 to receive incoming requests in step 250. The local threads 202 are set to block on the local queue 190 and the global threads 204 are set to block on the global queue 200 in step 252. An amount of memory 21 sufficient to make the N number of SPGetRequest calls is allocated in step 254. The last step 256 in the initialization phase is to make N number of SPGetRequest calls to the ATP to initiate the listening of requests.

Figure 8A:
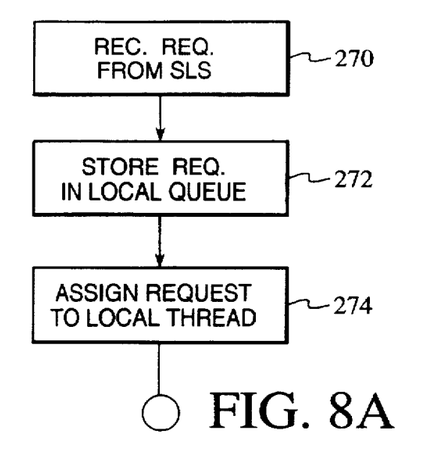
FIGS. 8A and 8B are flow charts depicting the steps taken during the queuing phase of the present invention.

FIG. 8A is a flow chart depicting the steps taken during the queuing phase when a request arrives at the SLS 170. Referring to FIGS. 6 and 8A, the ATP 120 receives the request from the SLS 170 in step 270, and then the ASP 130 places the request into the local queue 190 for processing in step 272. As stated above, the local threads 202 are blocked on the local queue 190, waiting for requests to arrive. When a request becomes available, it is assigned to the first available local thread for processing in step 274.

Figure 8B:
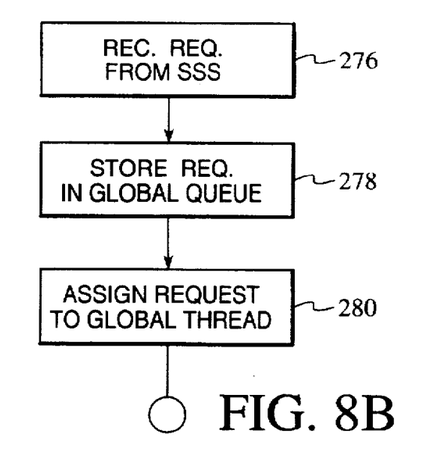

FIG. 8B is a flow chart depicting the steps taken during the queuing phase when a request arrives at an SSS 180. The ATP 120 receives the request from the SSS 180 in step 276, and then the ASP 130 places the request into the global queue 200 for processing in step 278. As stated above, the global threads 204 are blocked on the global queue 200, waiting for requests to arrive. When a request becomes available, it is assigned to the first available global thread for processing in step 280.

Figure 9:
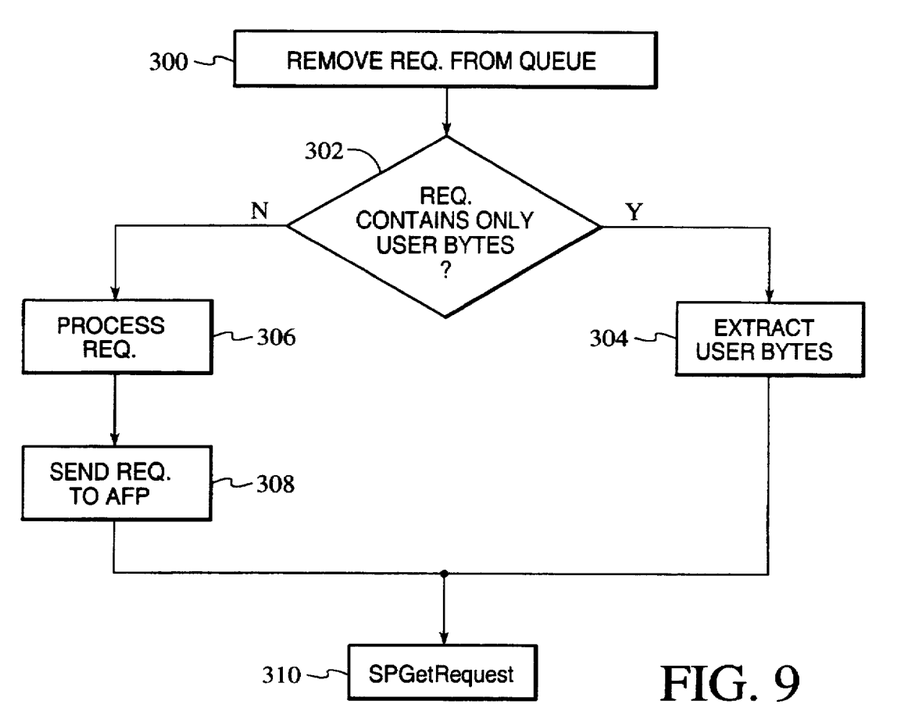
FIG. 9 is a flow chart depicting the steps taken by both a local thread and a global thread when executed.

FIG. 9 is a flow chart depicting the steps taken by both a local thread 202 and a global thread 204 when executed. First the thread removes the incoming request from its respective queue in step 300. Requests received over the SLS 170 are session-opening, session maintenance, and control commands that only contain ATP user bytes (4 bytes). Request received over an SSS 180 contains both ATP user bytes and ATP data bytes (0–578 bytes). If its determined that the request only contains ATP user bytes in step 302, then the thread extracts the user bytes and processes the session-type command in step 304. If the request contains ATP data bytes, then the thread processes the request in step 306, and sends the request to the AFP 130 for AFP processing in step 308. The final step is for the thread to initiate an SPGetRequest call to allow a socket to receive another request in step 310.

The two phase processing and the use of queues of the present invention allows the ASP 130 to initiate an independent number of SPGetRequest calls for receiving request even though there is a lesser number of threads available for processing. The ability to make many SPGetRequest calls means that even during heavy network traffic, all incoming requests are received, while a smaller number of threads means less use of system resources.

Another approach to this problem would be to bind one thread to one socket. This approach is unsatisfactory. If requests arrive at only a few sockets, then only those threads associated with those sockets are busy. The threads associated with the other sockets remain idle. In the present invention, a thread is bound to a queue, rather than a particular socket, where the use of the thread is maximized. Therefore, the present invention ensure that all threads are in use whether requests arrive from only one network entity or multiple entities.

A method and system for maximizing the use of threads for processing request in a network protocol layer has been disclosed. One with ordinary skill in the art will recognize that the present invention is not limited to the AppleTalk protocol or the Macintosh file system, but rather can be implemented with any type of network protocol and any type of file system. Software written according the present invention is intended to reside in some form of computer readable medium, such as memory or disk or communicated via a network, and compiled and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for maximizing the use of threads in a file server process for processing requests received from entities on a network, the file server process including a fist socket and a plurality of second sockets for receiving requests from entities on a network, the method comprising the steps of:

(a) providing a first queue for storing requests received from the first socket, the requests received from the first socket including a first type of request for opening a session;

(b) providing a second queue for storing requests received form the plurality of second sockets, the requests received from the plurality of second sockets being a second type of request;

(c) processing the first type of request in the first queue with a first set of threads; and (d) processing the second type of request in the second queue with a second set of threads.

2. A method as in claim 1 wherein step (a) includes the step of:

(a1) allocating memory for receiving the requests from the first socket and from the plurality of second sockets.

3. A method as in claim 2 wherein the file server software resides in a file server including a network protocol having an AppleTalk Session Protocol ("ASP") layer and an AppleTalk Transaction Protocol ("ATP") layer, wherein step (c) further includes the step of:

(c1) issuing N number of get request calls from the ASP layer to the ATP layer to receive the requests from the network.

4. A file server having a file server process for processing request received from entities on a network, the file server comprising:

a first queue for storing a first type of request for opening a session received over the network;

a second queue for storing a second type of request received over the network;

means for processing the first type of request in the first queue with a first set of threads; and means for processing the second type of request in the second queue with a second set of threads, wherein the use of the threads in the file server process is maximized.

5. A file server as in claim 4 further including:

a first socket for receiving the first type of request; and a plurality of second sockets for receiving the second type of request.

6. A file server as in claim 5 further including a network protocol having an AppleTalk Session Protocol ("ASP") layer and an AppleTalk Transaction Protocol ("ATP") layer, wherein the first and second types of request are passed from the ATP layer to the ASP layer upon receipt.

7. A method for maximizing the use of threads in a file server process for processing requests received from entities on a network, the file server process including a first socket for receiving a first type of request from entities on a network and a plurality of second sockets for receiving a second type of request from the entities, the method comprising the steps of:

(a) initializing a first queue;

(b) initializing a second queue;

(c) allocating memory for receiving requests from the first socket and from the plurality of second sockets;

(d) storing the first type of request received from the first socket in the first queue, the first type of request for opening a session;

(e) storing the second type of request received from the plurality of second sockets in the second queue;

(f) processing the first type of request in the first queue with a first set of threads;

(g) processing the second type of request in the second queue with a second set of threads.

8. A method as in claim 7 wherein the file server software resides in a file server including a network protocol having an AppleTalk Session Protocol ("ASP") layer and an AppleTalk Transaction Protocol ("ATP") layer, wherein step (c) further includes the step of:

(c1) issuing N number of get request calls from the ASP layer to the ATP layer to receive the requests from the network.

9. A method as in claim 8 wherein N is equal to the number of plurality of second sockets.

10. A computer-readable medium for use in a system that includes a processor capable of accessing data stored by the computer-readable medium, the computer readable medium containing a program for maximizing the use of threads in a file server process for processing requests received from entities on a network, the file server process including a first socket and a plurality of second sockets for receiving requests from entities on a network, the program comprising:

providing a first queue for storing a first type of request received from the first socket, the first type of request socket for opening a session;

providing a second queue for storing a second type of request received from the plurality of second sockets;

processing the requests in the first queue with a first set of threads; and processing the requests in the second queue with a second set of threads.

11. A computer-readable medium as in claim 10 wherein the program further comprises:

allocating memory for receiving the requests from the first socket and plurality of second sockets.

12. A computer readable medium as in claim 11 wherein the program includes a network protocol having an AppleTalk Session Protocol ("ASP") layer and the file server includes an AppleTalk Transaction Protocol ("ATP") layer, and wherein the program further comprises:

issuing N number of get request calls from the ASP layer to the ATP layer to receive the requests from the network.

* * * * *